June 13, 1967  K. B. HIETT  3,324,487

CAR TOP BOAT

Filed April 11, 1966

INVENTOR.
KENNETH B. HIETT
BY Knox & Knox

United States Patent Office 3,324,487
Patented June 13, 1967

3,324,487
CAR TOP BOAT
Kenneth B. Hiett, 12703 Poway Road,
Poway, Calif. 92064
Filed Apr. 11, 1966, Ser. No. 541,749
4 Claims. (Cl. 9—1)

ABSTRACT OF THE DISCLOSURE

This is a car top boat assembly wherein the gunwale of the boat has a continuous, resilient edge moulding and the gunwale is configured and dimensioned so that the edge moulding conforms exactly with and fits into a continuous concavity in the upper face of a conventional peripheral drip rail on the vehicle top. Securement is attained by sleeves on the gunwale and bolts passed through said sleeves with washers engaging under the drip rail.

---

The present invention relates to boats and specifically to a car top boat.

The primary object of this invention is to provide a boat which fits closely on and is secured to existing structure of a conventional vehicle, without the need for special racks, brackets, or other supporting means.

Another object of this invention is to provide a boat which is shaped to seat into the existing drip rail channel surrounding the top of a vehicle, the boat forming an extended top conforming to the general lines of the vehicle for neat appearance and a minimum of obstruction, making it practical to leave the boat mounted on the vehicle at all times except when actually put to use.

Another object of this invention is to provide a boat which is fastened to a vehicle by simple screw type fasteners through oarlocks incorporated into the boat.

The boat and its mounting on a vehicle are illustrated in the drawing, in which.

Similar characters of reference indicate similar or identical elements and portions throughout the specification and throughout the views of the drawing.

Figure 1:
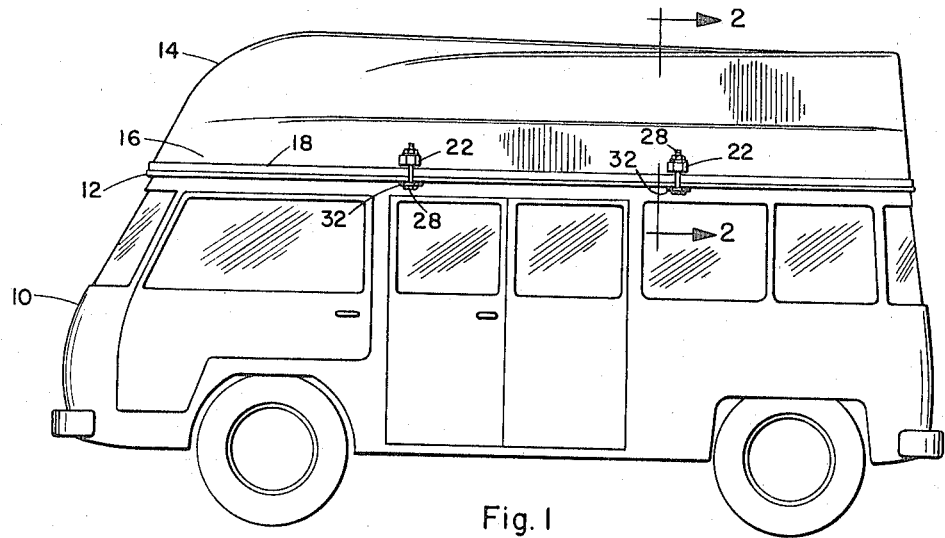
FIGURE 1 is a side elevation view of the boat mounted on a vehicle.
Figure 2:
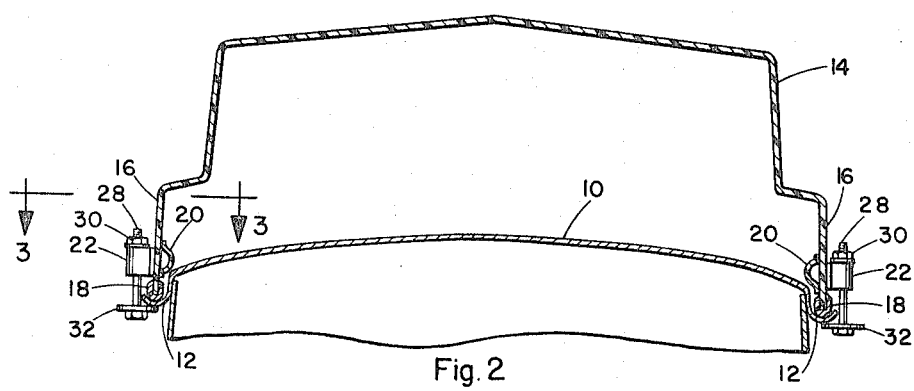
FIGURE 2 is an enlarged sectional view taken on line 2—2 of FIGURE 1.
Figure 3:
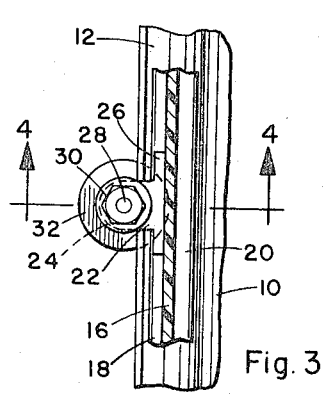
FIGURE 3 is a further enlarged sectional view taken on line 3—3 of FIGURE 2.
Figure 4:
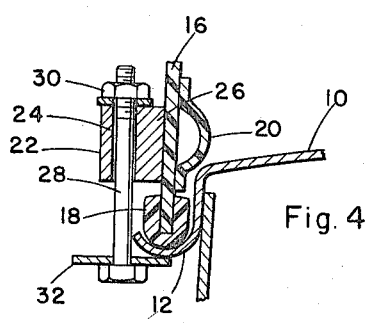
FIGURE 4 is a sectional view taken on line 4—4 of FIGURE 3.

The vehicle as illustrated is a bus or wagon type which is popular for camping and touring and is available in a variety of forms. This type of vehicle is used as an example, since the large roof will accommodate a boat of considerable size. The vehicle 10 normally has a drip rail channel 12 having a continuous, transversely arcuate concavity in the upper face thereof and extending completely, or almost completely around the roof structure at a substantially constant level.

The boat 14 has a gunwale 16 which is designed to fit closely on the vehicle roof, the gunwale having a continuous resilient edge molding 18 of plastic or rubber which is dimensioned and shaped to seat in the drip rail channel 12. The inside of gunwale 16 adjacent the edge is provided with a peripheral reinforcing member 20. Basic construction of the boat is illustrated as reinforced plastic material, which is readily formed to fit specific vehicle roof configurations, but other materials may be used. With the type of vehicle shown the gunwale of the boat is seated in the drip channel around the entire periphery of the roof structure, making the boat an extension of the roof and blending with the overall vehicle design. The specific hull shape can vary considerably and provision can be made for any suitable means of propulsion.

Small boats are conventionally fitted with oarlocks to allow rowing when necessary and in this instance the oarlocks serve a dual purpose. Two pairs of oarlocks 22 are illustrated, each being mounted on the outside of gunwale 16 at the location of reinforcing member 20. Each oarlock 22 comprises a substantially vertical tubular sleeve 24 with a bracket portion 26, which is bonded or otherwise secured to the gunwale 16 the reinforcing member 20 providing rigid support. The axis of each tubular sleeve 24 is substantially perpendicular to the edge of the gunwale and is set outwardly from the boat hull to receive a pivot pin of an oar. The boat is secured to the vehicle by bolts 28 inserted through the oarlock sleeves 24 and held by nuts 30, the bolts carrying large washers 32 which are engaged under the drip rail channel 12. It is not necessary to use specially shaped retainers to engage the drip rail, the bolts 28 fitting closely in the tubular sleeves 24 and being held in firm alignment alongside the drip rail. The washers 32 are thus held securely in place and are easier to handle than shaped retainers, since no specific positioning is required.

With the boat seated on the vehicle around all or most of its periphery and held at several positions by screw type clamps, the connection is very secure and it is practical to leave the boat on the vehicle at all times when not in use. The boat can, as illustrated, be designed to conform to the general shape of the vehicle and does not detract from the appearance.

To remove the boat it is only necessary to remove the bolts. Since the size of the boat is limited by the size of the vehicle, it will normally be possible for two people to lift the boat off the vehicle. When oars are not used the bolts can be stored in the oarlocks.

The boat is also adaptable to station wagons or other vehicles. In a vehicle whose roof is too small to provide full support for a boat of useful size, the boat may be designed to have its forward portion seated on the drip channel structure. In most cases any overhang at the rear will not be sufficient to require bracing to other parts of the vehicle structure, although bracing could be used to hold a boat on a truck with a small cab. In any combination, however, the primary support is provided by the vehicle roof, to which the boat is shaped, utilizing fasteners in the boat's oarlocks and engaging the vehicle drip rail channel.

It is understood that minor variation from the form of the invention disclosed herein may be made without departure from the spirit and scope of the invention, and that the specification and drawing are to be considered as merely illustrative rather than limiting.

I claim:
1. A vehicle having a drip rail channel transversely arcuate having a continuous concavity in the upper face thereof and extending around at least a major portion of the roof thereof;
   a boat having a gunwale and a continuous, resilient edge moulding on said gunwale dimensioned and shaped to conform to and seat in said continuous concavity in the vehicle drip rail channel;
   and securing means on said boat having portions engageable under the drip rail channel to clamp the boat thereon.
2. A vehicle having a drip rail channel extending around at least a major portion of the roof thereof;
   a boat having a gunwale portion shaped to conform to and seat in the vehicle drip rail channel;
   and securing means on said boat including oarlocks on said gunwale portion, said oarlocks having substantially vertical sleeve portions;

bolts inserted through said sleeve portions, and retaining elements on said bolts engageable with an under edge of the drip rail channel.

3. A boat according to claim 2, wherein said bolts are closely held in said sleeve portions against lateral shifting, and said retaining elements comprise large circular washers on said bolts and engaging under edge portions of said drip rail channel.

4. Structure according to claim 2 and including a reinforcing member on the inside of said gunwale portion at the location of said oarlocks.

References Cited

UNITED STATES PATENTS

| | | |
|---|---|---|
| D. 148,935 | 3/1948 | Kuns. |
| 2,310,431 | 2/1943 | Hart _____ 9—1 |
| 2,446,092 | 7/1948 | Lait. |
| 2,643,040 | 6/1953 | Hare _____ 224—42.1 |
| 3,032,784 | 5/1962 | Randrup _____ 114—219 X |

MILTON BUCHLER, *Primary Examiner.*

T. M. BLIX, *Assistant Examiner.*